United States Patent
Smedresman et al.

(10) Patent No.: US 10,415,638 B1
(45) Date of Patent: Sep. 17, 2019

(54) BEARING CENTERING SPRING AND DAMPER

(71) Applicant: United Technologies Corporation, Farmington, CT (US)

(72) Inventors: Adam G. Smedresman, Larchmont, NY (US); Christopher T. Anglin, Manchester, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 15/956,007

(22) Filed: Apr. 18, 2018

(51) Int. Cl.
  *F16C 27/04* (2006.01)
  *F16C 19/36* (2006.01)
  *F01D 25/16* (2006.01)

(52) U.S. Cl.
  CPC .......... *F16C 27/045* (2013.01); *F01D 25/164* (2013.01); *F16C 19/36* (2013.01); *F05D 2220/32* (2013.01); *F05D 2240/50* (2013.01); *F05D 2260/38* (2013.01); *F16C 2360/23* (2013.01); *F16C 2360/24* (2013.01)

(58) Field of Classification Search
  CPC .... F16C 19/36; F16C 27/045; F16C 2360/23; F01D 25/164; F05D 2240/50
  See application file for complete search history.

(56) References Cited

U.S. PATENT DOCUMENTS

| | | | |
|---|---|---|---|
| 3,097,895 A | | 7/1963 | Matt |
| 4,329,000 A | * | 5/1982 | Keske ............... F01D 25/16 384/464 |
| 4,429,923 A | | 2/1984 | White et al. |
| 4,884,903 A | * | 12/1989 | Pham ............... F01D 25/164 384/563 |
| 5,251,985 A | * | 10/1993 | Monzel ............... F16F 1/32 384/99 |
| 6,325,546 B1 | | 12/2001 | Storace |
| 6,695,478 B2 | * | 2/2004 | Bos ............... F01D 25/164 384/99 |
| 7,040,811 B2 | | 5/2006 | Dusserre-Telmon et al. |
| 8,834,095 B2 | | 9/2014 | Davis |
| 9,464,669 B2 | | 10/2016 | Kerr et al. |
| 9,752,616 B2 | | 9/2017 | Saadi et al. |
| 9,790,863 B2 | | 10/2017 | O'Brien |
| 9,841,056 B2 | | 12/2017 | Snow et al. |
| 9,926,975 B2 | | 3/2018 | Smedresman et al. |
| 2009/0263058 A1 | * | 10/2009 | Gibbons ............... F01D 25/164 384/99 |

(Continued)

OTHER PUBLICATIONS

Bugra H. Ertas et al, Synchronous Response to Rotor Imbalance Using a Damped Gas Bearing, J. Eng. Gas Turbines Power, 132(3), 032501, Dec. 1, 2009, The American Society of Mechanical Engineers, New York, NY.

(Continued)

*Primary Examiner* — Phillip A Johnson
(74) *Attorney, Agent, or Firm* — Bachman & LaPointe, P.C.

(57) ABSTRACT

A bearing spring support/damping apparatus has: a first end portion; a second end portion; and a flexible portion between the first end portion and the second end portion, and further comprising: an outer diameter groove in an outer diameter surface of the second end portion, and a radially and axially outwardly open rebate in the second end portion.

20 Claims, 7 Drawing Sheets

(56) References Cited

U.S. PATENT DOCUMENTS

| | | | |
|---|---|---|---|
| 2009/0269185 A1* | 10/2009 | Spencer | F01D 25/164 |
| | | | 415/119 |
| 2013/0156574 A1* | 6/2013 | Antunes | F01D 21/045 |
| | | | 415/229 |
| 2015/0240867 A1 | 8/2015 | Amador et al. | |
| 2016/0186607 A1 | 6/2016 | Witlicki et al. | |
| 2016/0327098 A1* | 11/2016 | Long, Jr. | F01D 25/164 |
| 2017/0122369 A1 | 5/2017 | Smedresman et al. | |

OTHER PUBLICATIONS

U.S. Office Action dated Apr. 19, 2019 for U.S. Appl. No. 16/041,041.

* cited by examiner

BEARING CENTERING SPRING AND DAMPER

BACKGROUND

The disclosure relates to turbomachine bearings. More particularly, the disclosure relates to turbomachine bearing centering spring/damper systems.

Turbomachines, namely, gas turbine engines (broadly inclusive of turbofans, turbojets, turboprops, turboshafts, industrial gas turbines, and the like) have numerous rolling element (ball or roller) bearing systems intervening between one or more spools and static or fixed structure (e.g., the engine case). Various spring mounting/retaining systems exist such as to accommodate tolerance of the rotating components, vibration, inertial loading due to aircraft maneuvering, and the like. The spring action may be damped by a fluidic damper (e.g. a "squeeze-film" damper which may use bearing lubrication oil as the fluid). One genus of these systems involve springs which are often referred to as "squirrel cage" springs due to their geometry. In addition to the radial spring action, depending on implementation the spring may serve to axially position the associated bearing race.

One example of a squirrel cage retainer is disclosed in U.S. Pat. No. 9,464,669 (the '669 patent) of Kerr et al., Oct. 11, 2016, the disclosure of which is incorporated by reference in its entirety herein as if set forth at length. The term "squirrel cage" relates somewhat to the hamster wheel like appearance of the spring/retainer with two full annulus end portions separated by a center portion having a circumferential array of longitudinal beams or legs joining the two end portions and separated by gaps. The circumferential array of legs and gaps provides flexibility at a desired spring rate allowing excursions of the two end portions off their coaxial condition. In the '669 patent configuration, one of the ends (the proximal end and, in the example, forward end) comprises a mounting flange for mounting to the associated structure (e.g., static structure in that example). The opposite second end portion has features for bearing engagement and fluid damping. Specifically, the inner diameter (ID) surface of the second end portion is dimensioned to receive the outer diameter (OD) surface of the associated bearing outer race. The ID surface face may bear features for also axially retain/engaging the outer race.

The OD surface of the second portion bears two annular grooves. The grooves each carry a seal (e.g., a ring seal such as a piston ring seal (e.g., metallic), an elastomeric O-ring seal, spring-loaded carbon seal, or the like). The second portion is mounted in close sliding relationship surrounded by external structure including one or more fluid ports between the two grooves/seals. Pressurized fluid (e.g., oil) is introduced via the ports. The fluid in the damping chamber formed between the grooves/seals maintains a fluid film in the region between the grooves. This thin film (the "squeeze film") provides small amounts of displacement and damping. The natural frequency of the system is a function of the effective mass of the system, spring rate, and the squeeze-film damping. The presence of the two grooves and seals renders the configuration a "closed damper" configuration (although there will be small amounts of leakage past the seals).

A more complex configuration of squirrel cage is shown in U.S. Patent Application Publication No. 2017/0122369A1 (the '369 publication) of Smedresman et al., May 4, 2017, the disclosure of which is incorporated by reference in its entirety herein as if set forth at length. The '369 publication has a retainer wherein the first end portion also engages the outer race of a different bearing. In the '369 publication configuration, the forward portion of the retainer has a fluid damping relationship with the outer race of the associated bearing in a similar way as the static structure has to the second end portion of the retainer of the '669 patent.

Yet other variations are more complicated and have more convoluted cross-sectional profiles. For example, whereas the aforementioned examples have the squirrel cage center portion extending close to straight axially between two axial end portions, other configurations having jogs or zigzags in their axial cross-section are possible. Several such variations are variations disclosed in U.S. Patent Application Publication No. 2015/0240867A1 (the '867 publication) of Amador et al., Aug. 27, 2015, the disclosure of which is incorporated by reference in its entirety herein as if set forth at length.

A further zigzag configuration is shown in U.S. Patent Application Publication 2016/0186607A1 (the '607 publication) of Witlicki et al., Jun. 30, 2016, the disclosure of which is incorporated by reference in its entirety herein as if set forth at length where a two-piece spring/damper is created by having a squirrel cage spring extending axially between one axial end portion and a second axial end portion of that spring. However, the damper is formed along a second piece having a first axial end mounted to the second axial end of the spring and having a body extending axially back towards the spring first end portion to join a second end portion bearing the grooves for the seals for the damper. Thus, the first end portion of the spring which serves for mounting may be axially very close to the second end portion of the second piece which bears the damping features. Depending upon the situation, the second piece may itself have a squirrel cage spring construction or may be relatively rigid.

A similar damper configuration is the "open damper" which lacks the two grooves/seals. See, Bugra H. Ertas et al., "Synchronous Response to Rotor Imbalance Using a Damped Gas Bearing", *J. Eng. Gas Turbines Power*, 132(3), 032501, Dec. 1, 2009, The American Society of Mechanical Engineers, New York, N.Y. Such a configuration allows escape of fluid from the gap between spring and static structure. A greater supply of fluid will be required in an open damper relative to a similar closed damper and the configuration will have different damping characteristics.

SUMMARY

One aspect of the disclosure involves a bearing spring support/damping apparatus comprising: a first end portion; a second end portion; and a flexible portion between the first end portion and the second end portion. There is an outer diameter groove in an outer diameter surface of the second end portion and a radially and axially outwardly open rebate in the second end portion.

A further embodiment of any of the foregoing embodiments may additionally and/or alternatively include a first annular seal carried by the groove and a second annular seal carried by the rebate.

A further embodiment of any of the foregoing embodiments may additionally and/or alternatively include the first annular seal being cast iron and the second annular seal being steel.

A further embodiment of any of the foregoing embodiments may additionally and/or alternatively include a wave spring between the second annular seal and a radially-extending face of the rebate.

A further embodiment of any of the foregoing embodiments may additionally and/or alternatively include there being only a single outer diameter groove in the outer diameter surface of the second end portion.

A further embodiment of any of the foregoing embodiments may additionally and/or alternatively include the apparatus comprising a first piece and a second piece. The first end portion is a first end portion of the first piece; the second end portion is a second end portion of the second piece; the first piece has a second end portion; and the second piece has a first end portion fastened to the second end portion of the first piece.

A further embodiment of any of the foregoing embodiments may additionally and/or alternatively include the flexible portion being a flexible portion of the first piece between the first piece first end portion and the first piece second end portion.

A further embodiment of any of the foregoing embodiments may additionally and/or alternatively include the flexible portion comprising a circumferential array of longitudinal beams.

A further embodiment of any of the foregoing embodiments may additionally and/or alternatively include the first end portion, the second end portion, and the flexible portion being of a single metallic piece.

A further embodiment of any of the foregoing embodiments may additionally and/or alternatively include the first end portion comprising a radially outwardly protruding mounting flange having a plurality of mounting holes.

A further embodiment of any of the foregoing embodiments may additionally and/or alternatively include the flexible portion comprising at least one of steel and titanium alloy.

A further embodiment of any of the foregoing embodiments may additionally and/or alternatively include a turbomachine including the apparatus and further comprising: static structure having a mounting portion to which the first end portion is mounted; a shaft mounted to rotate relative to the static structure; and a bearing having an inner race mounted to the shaft and having an outer race mounted to the second end portion.

A further embodiment of any of the foregoing embodiments may additionally and/or alternatively include a first seal carried by the groove and sealing with an inner diameter surface of a sealing portion of the static structure and a second seal carried by the rebate and sealing with the sealing portion of the static structure across an axial clearance between the second end portion and the static structure.

A further embodiment of any of the foregoing embodiments may additionally and/or alternatively include the first seal being under hoop compression and the second seal being under hoop tension.

A further embodiment of any of the foregoing embodiments may additionally and/or alternatively include the axial clearance being less than a radial clearance between the second end portion and the inner diameter surface of the sealing portion.

A further embodiment of any of the foregoing embodiments may additionally and/or alternatively include the second seal being locally radially proud of the outer diameter surface.

A further embodiment of any of the foregoing embodiments may additionally and/or alternatively include the turbomachine being a gas turbine engine.

A further embodiment of any of the foregoing embodiments may additionally and/or alternatively include a method for using the turbomachine. The method comprises: introducing a fluid to a radial clearance between the second end portion and the inner diameter surface of the sealing portion.

Another aspect of the disclosure involves a machine comprising: a first member; a bearing; and a bearing spring support/damping apparatus. The apparatus comprises: a first end portion; a second end portion having an inner surface mounting the bearing and an outer surface radially inward of an inner surface of the first member; and a flexible portion between the first end portion and the second end portion. A first seal seals between the outer surface of the second end portion and the inner surface of the first member to a first axial side of a fluid outlet in the inner surface of the first member and a second seal seals axially between the second end portion and the first member to a second axial side of the fluid outlet axially opposite the first axial side to form a damper.

A further embodiment of any of the foregoing embodiments may additionally and/or alternatively include the second seal being locally radially proud of the outer surface.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

An initial example of a spring/damper is disclosed as a modification of one of the aforementioned two-piece zigzag section spring/dampers. The identification of two pieces does not mean only two pieces but rather two main pieces. As is discussed below, there are additional fasteners and the like involved.

Figure 1:
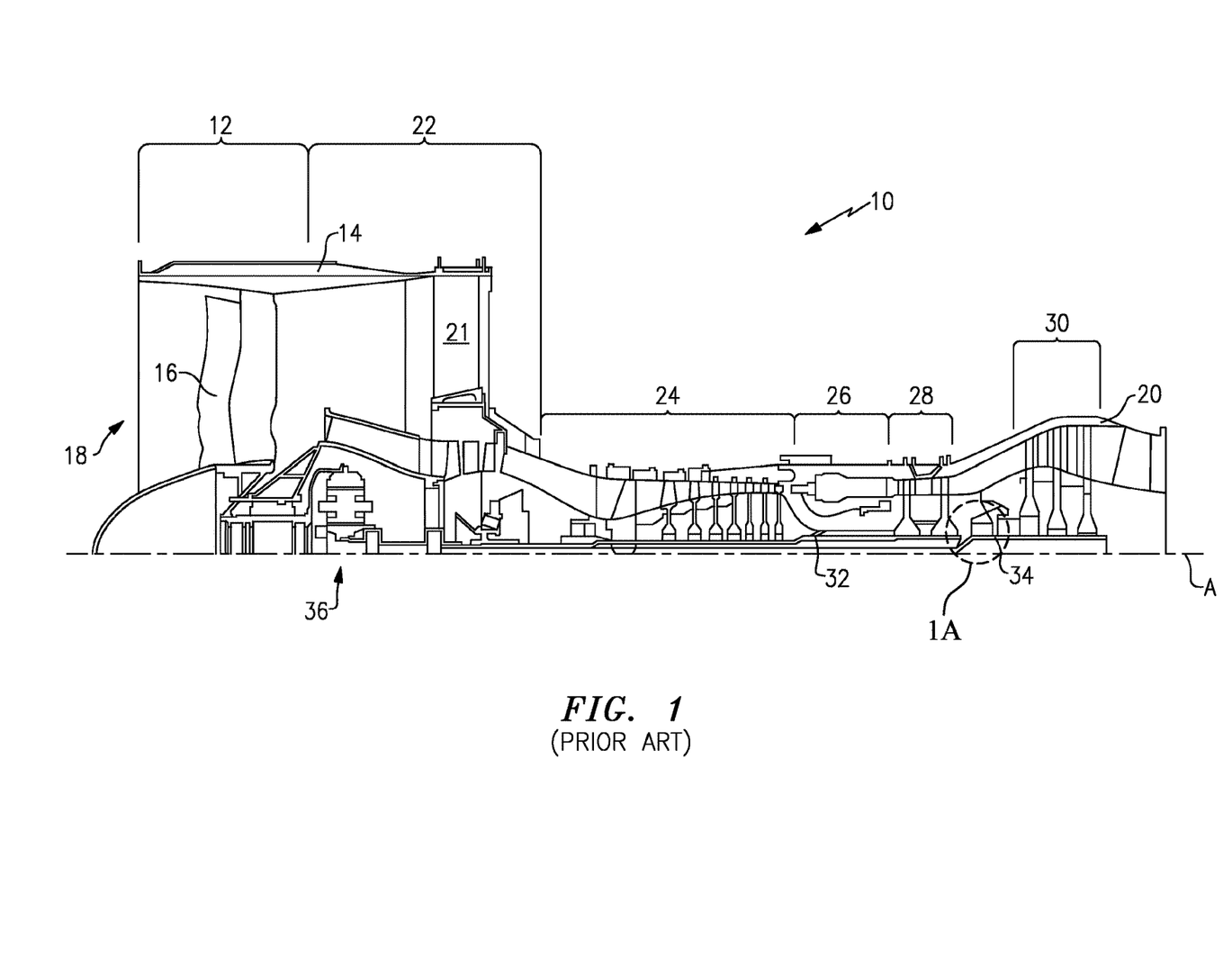
FIG. 1 is a simplified central axial sectional half view of a gas turbine engine.

FIG. 1 shows an exemplary simplified gas turbine engine 10 taken from U.S. Patent Application Publication 20110286836 (the '836 patent) of Davis, Nov. 24, 2011, the disclosure of which is incorporated herein by reference as if set forth at length. Engine 10 includes a fan section 12 within a fan case 14. The fan section 12 includes multiple blades at an inlet 18 of the fan case 14. A core 20 is supported relative to the fan case 14 such as by flow exit guide vanes 21. The core 20 includes a low pressure compressor section 22, a high pressure compressor section 24, a combustor section 26, a high pressure turbine section 28 and a low pressure turbine section 30. In one example, the blades of the low pressure compressor section 22 and low pressure turbine section 30 are supported on a low spool 34 rotatable about an axis A. An epicyclic fan drive gear system (FDGS) 36 couples the low spool rotor to the fan shaft to drive the fan. The blades of the high pressure compressor section 24 and high pressure turbine section 28 are supported on a high spool 32 rotatable about the axis A.

Figure 1A:
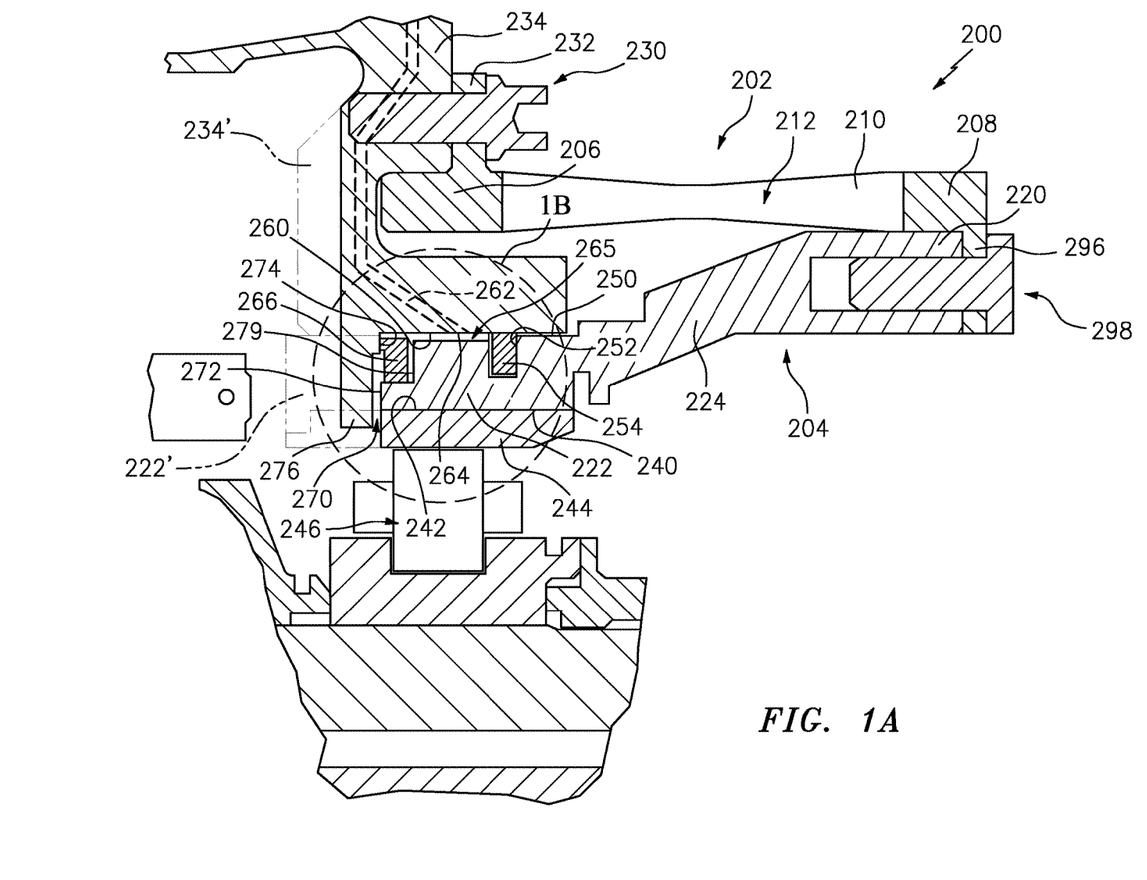
FIG. 1A is an enlarged view of a bearing area of the engine of FIG. 1.
Figure 2:
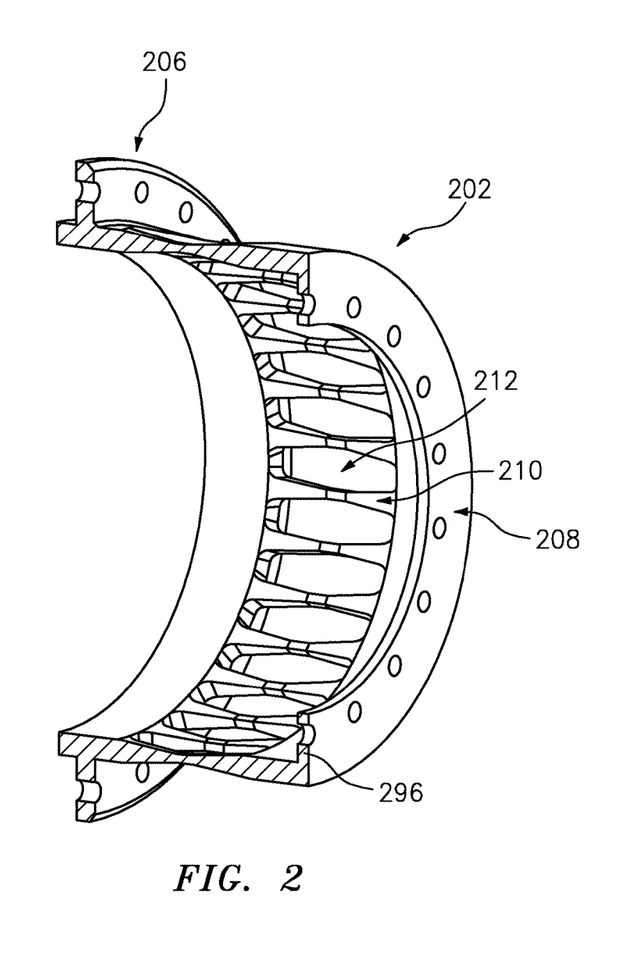
FIG. 2 is a view of a spring piece of the centering spring/damper of FIG. 1A.
Figure 3:
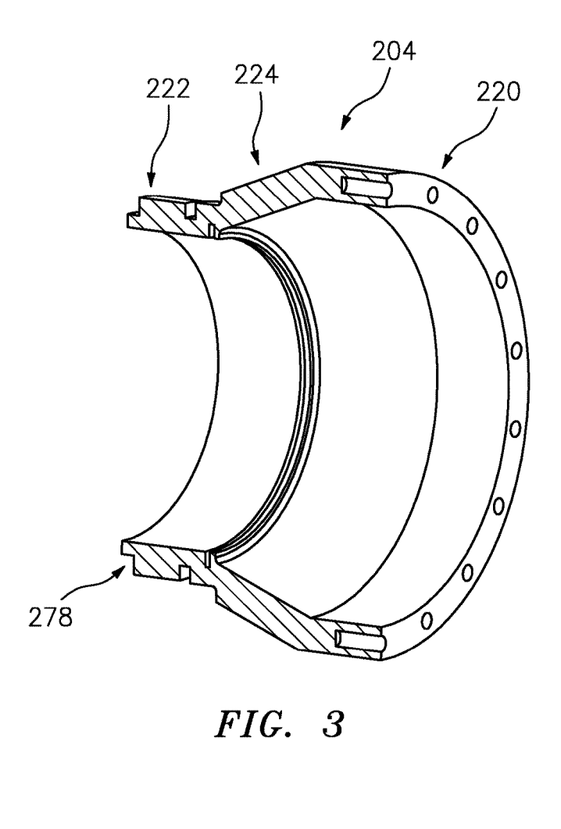
FIG. 3 is a view of a damper piece of the centering spring/damper of FIG. 1A.

FIG. 1A shows one of the main bearings of the engine. FIG. 1A specifically shows a spring/damper system 200 having a first piece 202 (also FIG. 2) and a second piece 204 (also FIG. 3). The first piece has a first annular end portion 206 (FIG. 1A) and an axially opposite second axial end portion 208. In between, a squirrel cage spring portion is formed by legs 210 and associated gaps 212. The second piece 204 comprises a first end portion 220 and a second end portion 222. An intermediate portion 224 extends between the end portions 220 and 222 and may be full annulus or segmented or may otherwise have apertures (see '607 publication) such as for passing fluid lines (e.g., for bearing lubricant) and the like. In the exemplary embodiment, the second piece 204 is relatively rigid compared to the flexibility offered the first piece by its squirrel cage legs 210. As is discussed further below, the first piece first end portion 206 is a proximal portion mounted to static engine structure (e.g., the case) such as via an array of fasteners 230 (e.g., screws) extending through a flange 232 of the first end portion 206 and into an associated flange 234 of the supporting structure (e.g. grounded to/integral with the case in this example).

The second piece 204 second end portion 222 is a distal portion having an inner diameter (ID) face 240 engaging and receiving the outer diameter (OD) face 242 of the outer race 244 of the rolling element bearing 246. The inner diameter (ID) race of the bearing 246 may be mounted to the outer diameter (OD) surface of a shaft.

The outer diameter (OD) surface 250 (FIG. 1A) of the second end portion 222 bears a groove 252 carrying a seal 254 (as discussed above). The seal engages the inner diameter (ID) surface 260 of a portion of the static structure. A fluid passageway 262 in the static structure has an outlet 264 to the surface 260 ahead of the seal 254.

As is so-far described, the system represents one example of a baseline system. However, the baseline system also has the second groove/seal discussed above so that the two grooves/seals define a closed damper damping chamber 265 axially spanning/surrounding the port 264 from the passageway 262. The FIG. 1A embodiment lacks such a second groove. Instead, there is second seal 266 sealing a gap 270 between an axial end 272 of the end portion 222 and an associated surface 274 of a portion 276 of the static structure (e.g., a radially inboard wall portion added to the baseline flange 234). The second seal 266 is carried in an axially and radially outwardly open shoulder or rebate 278 (FIG. 1B) having a radial face (radially extending but axially facing) 279 and an axial face (axially extending but radially facing) 280.

Figure 1B:
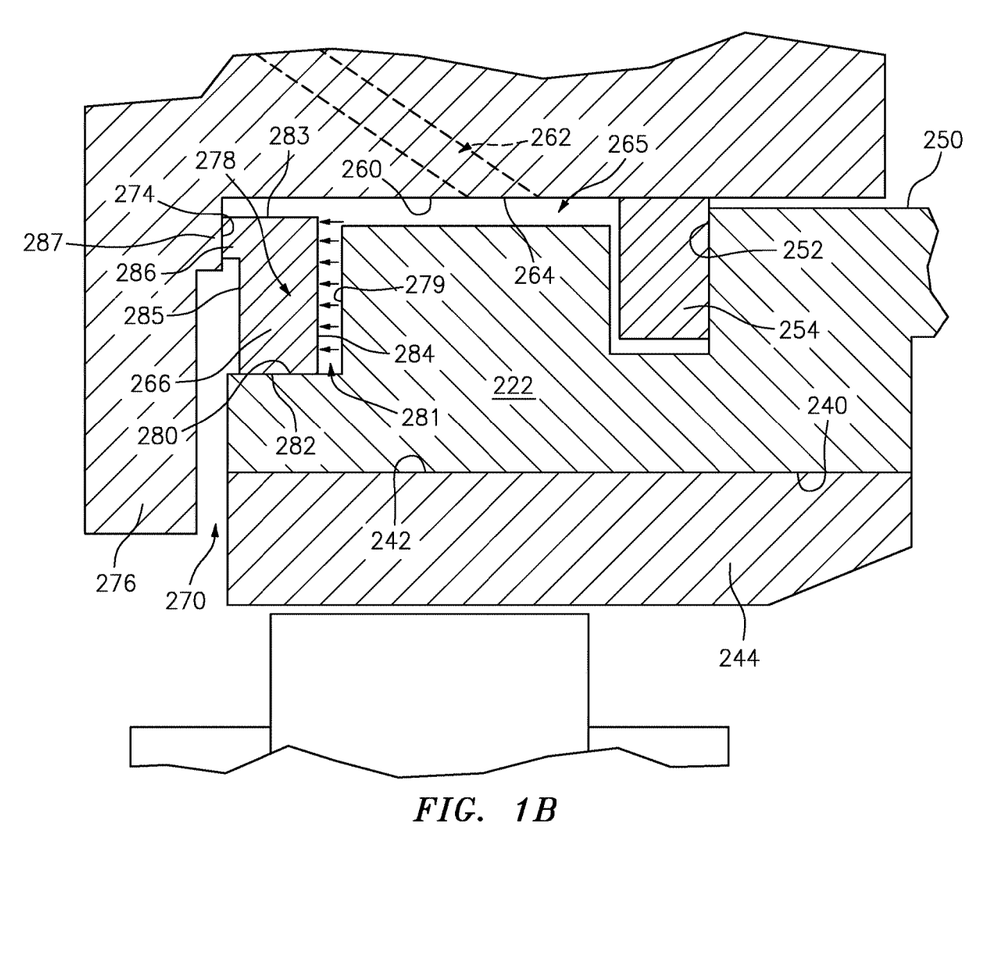
FIG. 1B is a further enlarged view of a damper of the bearing area of FIG. 1A.

The second seal 266 may be made of a conventional seal material. Particular examples are discussed below. The exemplary second seal has an inner diameter (ID) or radially-inboard surface 282 and outer diameter (OD) or radially outboard surface 283. The exemplary ID surface 282 contacts the axial face 280. The OD surface 283 is, however, radially spaced apart from the ID surface 260 of the adjacent static structure. FIG. 1B further shows the second seal 266 as having a first axial end surface 284 and an opposite second axial end surface 285. In operation, the surface 284 is spaced slightly apart from the rebate radial face 279 to create a gap 281 extending radially inward from the damping chamber 265. The gap 281 allows pressure from the fluid (oil) exiting the passageway 262 outlet 264 into the damping chamber 265 to bias the second seal into engagement with the surface 274 of the static structure 276. This axial bias is caused by the pressure in the damping chamber 265 and thus the gap 281 being greater than the pressure in the gap 270.

Figure 6:
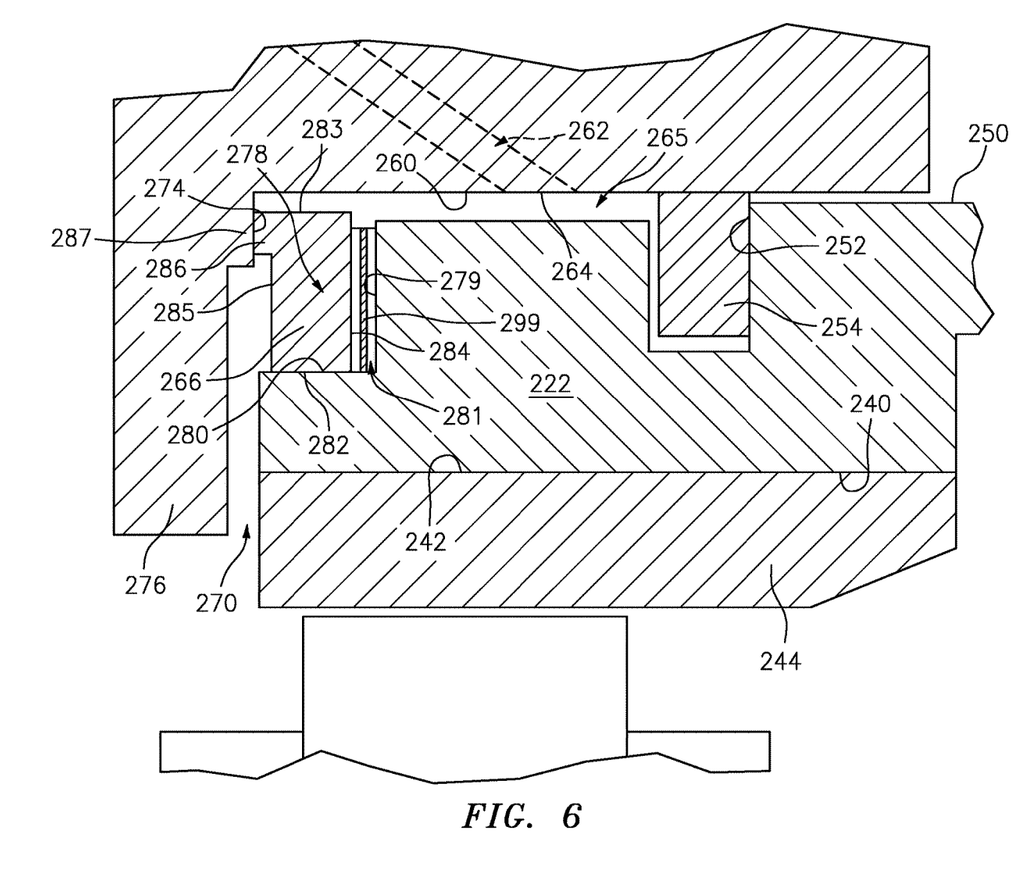
FIG. 6 is a view of the FIG. 1B damper area with an added wave spring.

Further variations may replace or augment this axial bias with axial spring bias. For example, a metallic wave spring 299 (FIG. 6) in the gap 281 may add axial bias while still exposing the face 284 to the chamber 265 fluid pressure. The illustrated spring is a single-turn wave spring (closed or open). Alternative wave springs are multi-turn or stacked wave springs. The wave spring's added axial bias provides a preload against binding so as to ensure the seal seats against the surface 274 to, in turn, allow the fluid pressure to further increase engagement force between the seal and surface 274.

The exemplary seal is configured so that the contact area between the surface 274 and the seal end surface 285 is over only a small portion of the radial span of the second seal (radial span between ID surface 282 and OD surface 283). In the exemplary embodiment, this is achieved by forming the seal with an axial protrusion 286 having a radial span of less than half of the radial span between seal ID and OD surfaces 282 and 283, more particularly 15% to 30%. However, the seal may be otherwise configured such as having a symmetric central axial half section (e.g., rectangular).

Unlike the seal 254 contacting the surface 260, there is a radial gap between the OD surface 283 of second seal 266 and the damping chamber 265 OD surface 260. The second seal, may thus be in hoop tension that provides at least a slight compressive engagement between the seal ID surface 282 and the surface 280. Thus, there may be further differences between the two seals (beyond the mere fact that the second seal seals axially with the static structure).

One such difference is the hoop stress. Whereas the second seal may be in slight hoop tension, the first seal may be in slight hoop compression. There may be associated materials differences due to such stress. For example, the second seal 266 may have material chosen to be better under tension (one with higher LCF stress and/or creep margin). For example, the first seal might be a cast iron while the second seal is a steel (e.g., stainless) which may have better tensile properties.

Similarly, the material of the second seal 266 may be chosen for greater flexibility in axial section. This might be particularly relevant where there is binding at the seal ID surface.

Also, the ID surface 282 may be polished for smoothness and low friction and/or formed by an anti-friction coating on the steel or iron substrate of the seal 266 to prevent binding and allow the seal to axially slide. For example, the coating might be a hard face coating such as titanium nitride or a diamond-like coating (e.g., diamond-like carbon (DLC) or diamond-like nanocomposite (DLN)) applied such as by flame spray, plasma spray, or vapor deposition.

The elimination of the second groove relative to the baseline allows reduction in the axial length of the end portion 222 which may, in turn, allow reduction in the axial length of the engine. For example, FIG. 1A shows, in broken line, the extent of a baseline structure 234' and baseline retainer distal portion 222'. These protrude substantially beyond the revised corresponding portions 234 and 222. The saved space may be utilized in a further modification to shorten the engine, shifting the portion 234 forward relative to the structure immediately ahead of it.

The gap 270 may be an axial gap between two purely radial surfaces and may have a length that is smaller than the centered radial clearance between the surfaces 250 and 260.

At least for a mid-thrust gas turbine engine, exemplary centered radial clearance of gap 265 is from greater than zero to 20 mils (0.5 mm) (e.g. (1.0 mil to 20 mils (25 micrometer to 0.5 mm) or 5.0 mils to 20.0 mils (0.13 mm to 0.5 mm) or 5.0 mils to 10.0 mils (0.13 mm to 0.25 mm)). An exemplary axial clearance of the gap 270 is less than the centered radial clearance. An exemplary axial clearance is from more than zero to 20 mils (0.5 mm), more narrowly 1.0 mil to 10 mils (25 micrometer to 0.25 mm) or 2.0 mils to 5.0 mils (51 micrometer to 0.13 mm). However, in general one would seek to minimize the axial gap while tuning the radial gap for damping.

FIG. 1A additionally shows the mounting of the two pieces to each other. In this example, the second end portion 208 of the first piece 202 has a flange 296 having a hole circle. The forward face of the flange 296 abuts the aft face of the first end portion 220 of the second piece 204. The first end portion 220 has a circle of threaded bores complementary to the holes of the flange to respectively receive threaded fasteners 298 (e.g., screws) to secure the two together.

Figure 4:
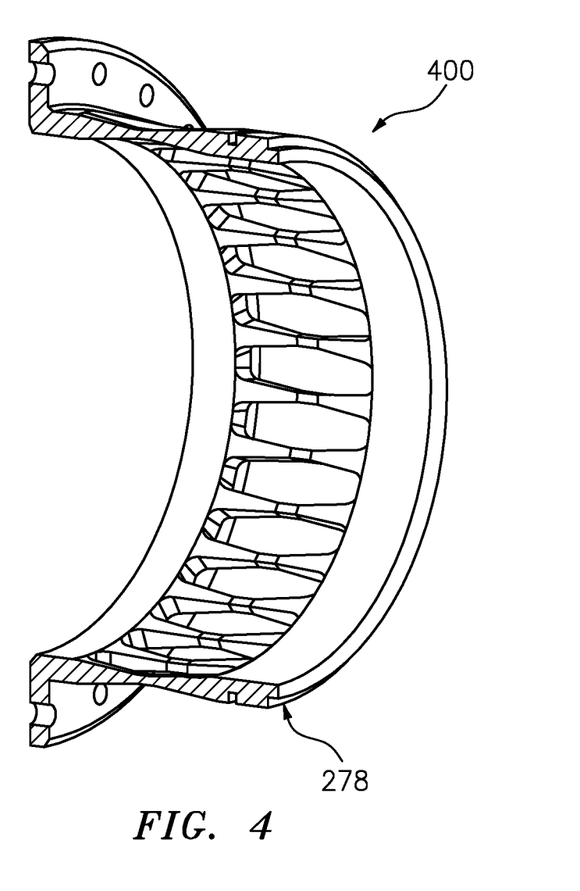
FIG. 4 is a view of an alternative single-piece spring/damper.
Figure 5:
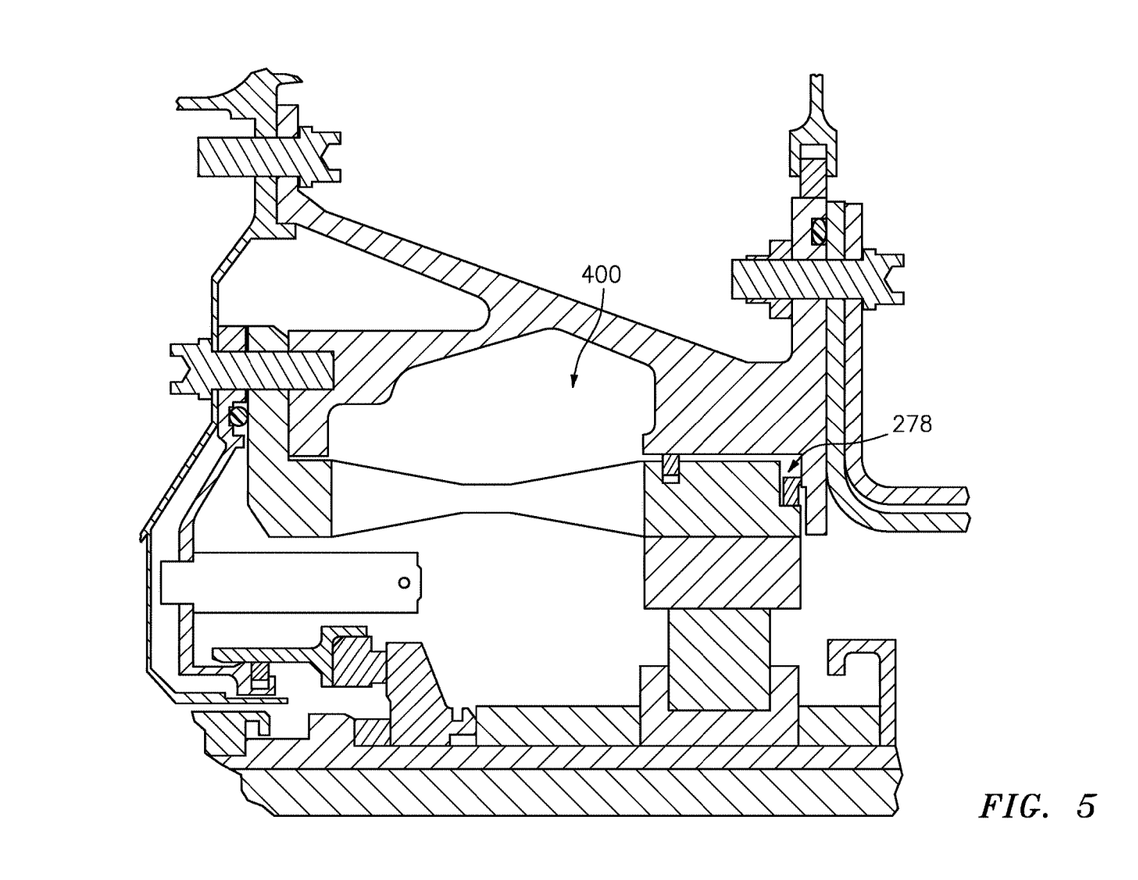
FIG. 5 is a partial central axial sectional view of the FIG. 4 spring/damper in an engine.

FIG. 4 shows a single-piece spring/damper 400 such as may be used in systems such as the '669 publication (see, also, configuration illustrated, but not discussed, in U.S. Pat. No. 8,439,637). FIG. 5 shows the spring/damper 400 installed in an engine with similar interfaces to similar features to that of the spring/damper of FIG. 1A.

Accordingly, it is seen that when implemented as a modification of a baseline (e.g., prior art such as those referenced above) configuration, the foregoing teachings may be implemented at various levels. A first order modification is simply to remove one of the two channels/grooves while leaving the other and adding the rebate and seal.

There may be many second order or beyond modifications. For example, one such modification involves adding the static structure wall 276 adjacent the end of the distal end portion 222 if not already present. Another involves shortening the distal end portion.

Another second order modification involves lengthening the legs/beams. For example the beam increase may partially offset the decrease in distal end portion 222 length (and is thus particularly relevant in single-piece constructions). Lengthening the beams may reduce their strains at a given deflection of the distal end portion and thus may reduce stress and improves service life. Lengthened beams may be thickened to maintain spring rate.

Another second order modification involves repositioning the remaining groove. For example, one might shift the groove to maintain length of the squeeze film. This might involve shifting the remaining groove toward the distal end. In such a case, this opens up further ability to lengthen the beam and gaps (see discussion immediately above) to further optimize spring performance. Third order modifications involve making use of the longitudinal space savings and modifying adjacent structure or even shortening the engine overall.

Manufacture may be by conventional materials and techniques (e.g., machining the spring and damper piece or pieces from alloys such as steels or titanium alloys such as on a lathe followed by hole drilling/tapping in a rotary fixture). Alternatively, one or more of the pieces may be made by additive manufacture techniques (e.g., electron beam melting (EBM) or direct metal laser sintering (DMLS)).

Further variations include alternative mounting means for mounting the spring (e.g., relative to engine static structure). Alternatives to the circumferential array of fastener holes in a flange include securing the proximal end portion via a large nut circumscribing the engine axis or welding the proximal end portion to the static structure. Among further variations are springs where the legs are separately formed from the end portions they are then secured to.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

Where a measure is given in English units followed by a parenthetical containing SI or other units, the parenthetical's units are a conversion and should not imply a degree of precision not found in the English units.

One or more embodiments have been described. Nevertheless, it will be understood that various modifications may be made. For example, when applied to an existing baseline configuration, details of such baseline may influence details of particular implementations. Accordingly, other embodiments are within the scope of the following claims.

What is claimed is:

1. A bearing spring support/damping apparatus comprising:
   a first end portion;
   a second end portion; and
   a flexible portion between the first end portion and the second end portion, and further comprising:
   an outer diameter groove in an outer diameter surface of the second end portion;
   a radially and axially outwardly open rebate in the second end portion;
   a first annular seal carried by the groove; and
   a second annular seal carried by the rebate,
   wherein:
   the first annular seal is cast iron; and
   the second annular seal is steel.

2. The apparatus of claim 1 further comprising:
   a wave spring between the second annular seal and a radially-extending face of the rebate.

3. The apparatus of claim 1 wherein:
   there is only a single outer diameter groove in the outer diameter surface of the second end portion.

4. The apparatus of claim 1 wherein:
   the apparatus comprises a first piece and a second piece;
   the first end portion is a first end portion of the first piece;
   the second end portion is a second end portion of the second piece;
   the first piece has a second end portion; and
   the second piece has a first end portion fastened to the second end portion of the first piece.

5. The apparatus of claim 4 wherein:
   the flexible portion is a flexible portion of the first piece between the first piece first end portion and the first piece second end portion.

6. The apparatus of claim 1 wherein:
   the flexible portion comprises a circumferential array of longitudinal beams.

7. The apparatus of claim 1 wherein:
   the first end portion, the second end portion, and the flexible portion are of a single metallic piece.

8. The apparatus of claim 1 wherein:
the first end portion comprises a radially outwardly protruding mounting flange having a plurality of mounting holes.

9. The apparatus of claim 1 wherein:
the flexible portion comprises at least one of steel and titanium alloy.

10. A turbomachine including the apparatus of claim 1 and further comprising:
static structure having a mounting portion to which the first end portion is mounted;
a shaft mounted to rotate relative to the static structure; and
a bearing having an inner race mounted to the shaft and having an outer race mounted to the second end portion.

11. The turbomachine of claim 10 further comprising:
a first seal carried by the groove and sealing with an inner diameter surface of a sealing portion of the static structure; and
a second seal carried by the rebate and sealing with the sealing portion of the static structure across an axial clearance between the second end portion and the static structure.

12. The turbomachine of claim 11 wherein:
the first seal is under hoop compression; and
the second seal is under hoop tension.

13. A turbomachine comprising:
a static structure having a mounting portion
a shaft mounted to rotate relative to the static structure;
a bearing having an inner race mounted to the shaft and having an outer race
a bearing spring support/damping apparatus comprising:
a first end portion mounted to the outer race;
a second end portion mounted to the static structure;
a flexible portion between the first end portion and the second end portion;
an outer diameter groove in an outer diameter surface of the second end portion;
a radially and axially outwardly open rebate in the second end portion;
a first seal and carried by the groove and sealing with an inner diameter surface of a sealing portion of the static structure; and
a second seal carried by the rebate and sealing with the sealing portion of the static structure across an axial clearance between the second end portion and the static structure
wherein:
the axial clearance is less than a radial clearance between the second end portion and the inner diameter surface of the sealing portion.

14. The turbomachine of claim 13 wherein:
the second seal is locally radially proud of the outer diameter surface.

15. The turbomachine of claim 13 being a gas turbine engine.

16. A method for using the turbomachine of claim 13, the method comprising:
introducing a fluid to a radial clearance between the second end portion and the inner diameter surface of the sealing portion.

17. A turbomachine comprising:
a static structure having a mounting portion
a shaft mounted to rotate relative to the static structure;
a bearing having an inner race mounted to the shaft and having an outer race
a bearing spring support/damping apparatus comprising:
a first end portion mounted to the outer race;
a second end portion mounted to the static structure;
a flexible portion between the first end portion and the second end portion;
an outer diameter groove in an outer diameter surface of the second end portion;
a radially and axially outwardly open rebate in the second end portion;
a first seal under hoop compression and carried by the groove and sealing with an inner diameter surface of a sealing portion of the static structure; and
a second seal under hoop tension and carried by the rebate and sealing with the sealing portion of the static structure across an axial clearance between the second end portion and the static structure.

18. The turbomachine of claim 17 being a gas turbine engine.

19. The turbomachine of claim 17 wherein:
the first end portion, the second end portion, and the flexible portion are of a single metallic piece.

20. The turbomachine of claim 17 wherein:
the first end portion comprises a radially outwardly protruding mounting flange having a plurality of mounting holes; and
the flexible portion comprises at least one of steel and titanium alloy.

* * * * *